(12) United States Patent  
Lopez et al.

(10) Patent No.: US 8,155,765 B2  
(45) Date of Patent: Apr. 10, 2012

(54) ESTIMATING RELATIVE HUMIDITY INSIDE A COMPUTER SYSTEM

(75) Inventors: Leoncio D. Lopez, Escondido, CA (US); Kenny C. Gross, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 779 days.

(21) Appl. No.: 12/114,363

(22) Filed: May 2, 2008

(65) Prior Publication Data

US 2009/0272176 A1  Nov. 5, 2009

(51) Int. Cl.
*G05B 13/04* (2006.01)
*G06F 11/00* (2006.01)

(52) U.S. Cl. ........................... 700/52; 714/48
(58) Field of Classification Search ............... 714/47, 714/48, 74.1, E11.02, E11.167; 700/52
See application file for complete search history.

(56) References Cited

U.S. PATENT DOCUMENTS

2008/0141072 A1* 6/2008 Kalgren et al. ............. 714/33
2008/0255819 A1* 10/2008 Gross et al. ................. 703/13

OTHER PUBLICATIONS

"Telecontrol." G. C. I. Lin and Y. C. Kao (ed.). Wiley Encyclopedia of Electrical and Electronics Engineering. 1999. pp. 460-470.*
Gross, K.C.; Bhardwaj, V.; Bickford, R., "Proactive detection of software aging mechanisms in performance critical computers," Software Engineering Workshop, 2002. Proceedings. 27th Annual NASA Goddard, Abstract, Dec. 5-6, 2002.*

* cited by examiner

*Primary Examiner* — Lisa Caputo
*Assistant Examiner* — Punam Roy
(74) *Attorney, Agent, or Firm* — Park, Vaughan, Fleming & Dowler LLP

(57) ABSTRACT

One embodiment of the present invention provides a system that estimates the relative humidity inside a computer system. During operation, a set of performance parameters of the computer system and an external relative humidity outside of the computer system are monitored. Then, the relative humidity inside the computer system is estimated based on the set of performance parameters, the external relative humidity, and a relative humidity model, wherein training of the relative humidity model includes measuring an external training relative humidity outside of the computer system and a training relative humidity inside the computer system while monitoring the set of performance parameters of the computer system.

18 Claims, 4 Drawing Sheets

ESTIMATING RELATIVE HUMIDITY INSIDE A COMPUTER SYSTEM

BACKGROUND

1. Field

The present invention generally relates to techniques for monitoring computer systems. More specifically, the present invention relates to a method and an apparatus that estimates a relative humidity inside a computer system

2. Related Art

Many mechanisms that lead to degradation and failure of electronic systems are accelerated by moisture and temperature. Therefore, due to the importance of moisture to long-term reliability of electronic systems, computer system vendors typically give guidelines to customers prescribing the optimal setting for relative humidity for data centers. However, as a practical matter, it may be difficult to maintain a uniform humidity throughout a large data center. Furthermore, even if the relative humidity of the air outside of the computer system is maintained within vendor specifications, dynamic workloads, fan speed changes, and power management features can cause the relative humidity inside the computer system to vary spatially, possibly significantly, from the vendor specifications. This can lead to reliability issues for components inside the computer system.

The relative humidity inside of the computer system can be measured using relative humidity sensors placed inside the computer system. However, this approach could add significant cost, complexity, and increased system bus I/O demands.

Hence, what is needed is a method and system that estimates a relative humidity inside a computer system without the above-described problems.

SUMMARY

Some embodiments of the present invention provide a system that estimates a relative humidity inside a computer system. First, a set of performance parameters of the computer system is monitored. Next, the relative humidity inside the computer system is estimated based on the set of performance parameters, and a relative humidity model, wherein training of the relative humidity model includes monitoring a training relative humidity while monitoring the set of performance parameters of the computer system.

Some embodiments further include monitoring a monitored relative humidity, wherein estimating the relative humidity inside the computer system includes estimating the relative humidity inside the computer system based on the monitored relative humidity.

In some embodiments, the training relative humidity includes a relative humidity inside the computer system.

In some embodiments, the training relative humidity includes a relative humidity outside the computer system.

In some embodiments, monitoring the set of performance parameters of the computer system includes systematically monitoring and recording a set of performance parameters of the computer system, wherein the recording process keeps track of the temporal relationships between events in different performance parameters.

In some embodiments, estimating the relative humidity inside the computer system includes using a pattern-recognition technique.

In some embodiments, estimating the relative humidity inside the computer system includes using a multivariate state estimation technique.

In some embodiments, training the relative humidity model includes using a pattern-recognition technique.

In some embodiments, training the relative humidity model includes using a multivariate state estimation technique.

Some embodiments of the present invention provide a system that estimates a relative humidity inside a computer system. First, a set of performance parameters of the computer system and an external relative humidity outside of the computer system are monitored. Next, the relative humidity inside the computer system is estimated based on the set of performance parameters, the external relative humidity, and a relative humidity model, wherein training of the relative humidity model includes measuring an external training relative humidity outside of the computer system and a training relative humidity inside the computer system while monitoring the set of performance parameters of the computer system.

In some embodiments, estimating the relative humidity inside the computer system based on the set of performance parameters, the external relative humidity, and a relative humidity model includes using a multivariate state estimation technique.

In some embodiments, training of the relative humidity model includes measuring the training relative humidity inside the computer system while varying a load on the computer system.

In some embodiments, estimating the relative humidity involves estimating a relative humidity at a plurality of locations inside the computer system, and training the relative humidity model includes measuring a training relative humidity at the plurality of locations inside the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
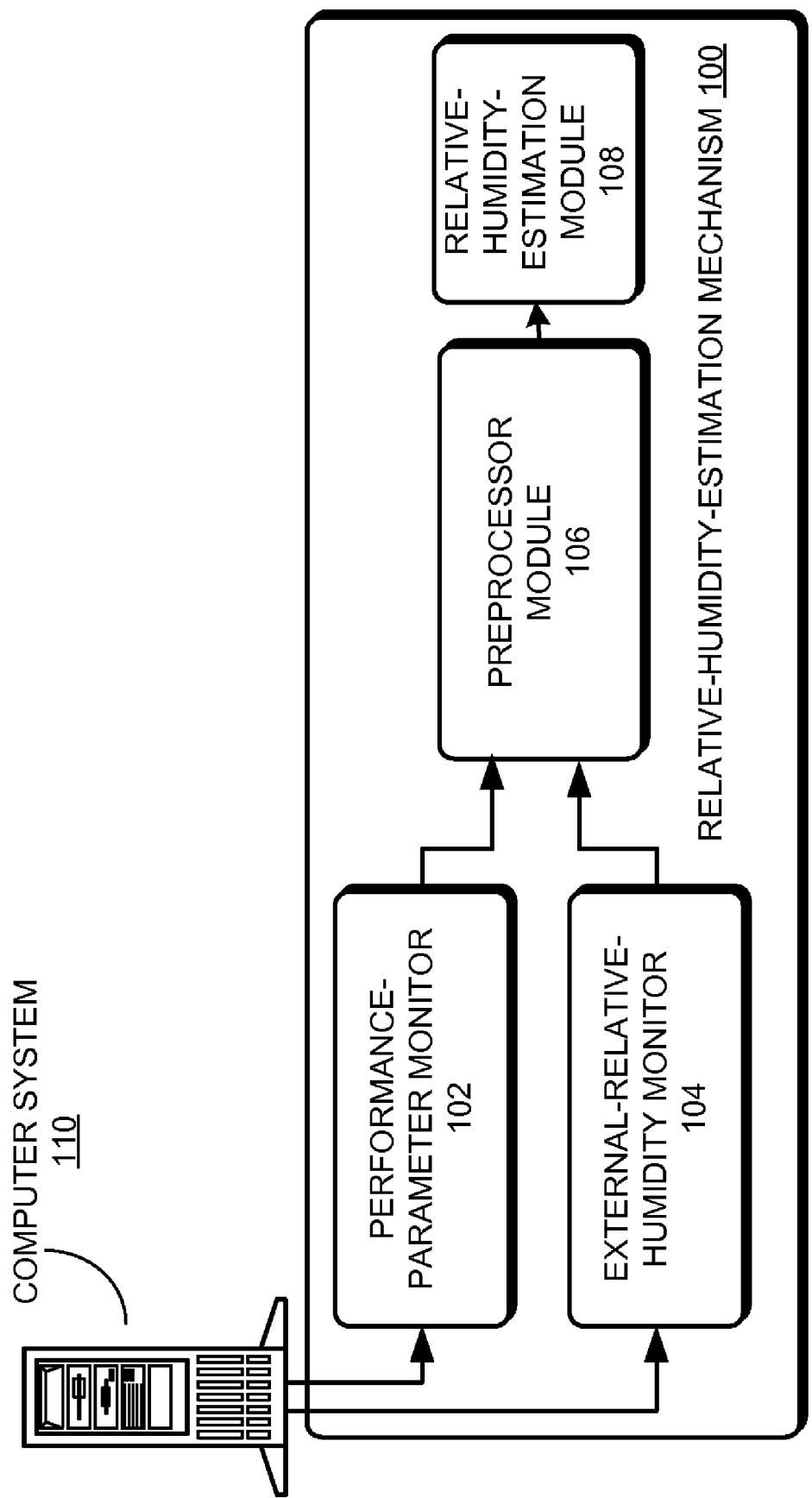
FIG. 1 represents a system that estimates a relative humidity inside a computer system in accordance with some embodiments of the present invention.

FIG. 1 represents a system that estimates a relative humidity inside a computer system in accordance with some embodiments of the present invention. Relative-humidity-estimation mechanism 100 includes performance-parameter monitor 102, external-relative-humidity monitor 104, preprocessor module 106, and relative-humidity-estimation module 108. Moreover, relative-humidity-estimation mechanism 100 is coupled to computer system 110. Note that computer system 110 can include but is not limited to a server, a server blade, a data center server, a field-replaceable unit, an enterprise computer, or any other computation system that includes one or more processors and one or more cores in each processor.

Performance-parameter monitor 102 can be any device that can monitor performance parameters of computer system 110, including but not limited to: temperatures, currents, voltages and fan speeds, performance metrics, loads, throughput variables, transaction latencies, and time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference. Performance-parameter monitor 102 can be implemented in any combination of hardware and software. In some embodiments, performance-parameter monitor 102 operates on computer system 110. In other embodiments, performance-parameter monitor 102 operates on one or more service processors. In still other embodiments, performance-parameter monitor 102 is located inside of computer system 110. In yet other embodiments, performance-parameter monitor 102 operates on a separate computer system. In some embodiments, performance-parameter monitor 102 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006.

External-relative-humidity monitor 104 can be any device that can monitor the relative humidity of the air outside of computer system 110. External-relative-humidity monitor 104 can be implemented in any combination of hardware and software. In some embodiments, external-relative-humidity monitor 104 operates on computer system 110. In other embodiments, external-relative-humidity monitor 104 operates on one or more service processors. In still other embodiments, external-relative-humidity monitor 104 is located inside of computer system 110. In yet other embodiments, external-relative-humidity monitor 104 operates on a separate computer system.

Preprocessor module 106 can be any device that can preprocess input received from performance-parameter monitor 102 and external-relative-humidity monitor 104 into a form for input into relative-humidity-estimation module 108. In some embodiments, preprocessor module 106 is omitted, or operates on performance-parameter monitor 102, external-relative-humidity monitor 104, or relative-humidity-estimation module 108. Preprocessor module 106 can be implemented in any combination of hardware and software. In some embodiments, preprocessor module 106 operates on computer system 110. In other embodiments, preprocessor module 106 operates on one or more service processors. In still other embodiments, preprocessor module 106 is located inside of computer system 110. In yet other embodiments, preprocessor module 106 operates on a separate computer system. In some embodiments, preprocessor module 106 implements techniques referred to and described in a U.S. patent application entitled "Synchronizing Signals Related to the Operation of a Computer System," by Kalyanaraman Vaidyanathan and Kenny C. Gross, application Ser. No. 12/101,321, filed Apr. 11, 2008, which is hereby fully incorporated by reference.

Relative-humidity-estimation module 108 receives input from preprocessor module 106 and generates an estimate of the relative humidity inside of computer system 110. Relative-humidity-estimation module 108 can be implemented in any combination of hardware and software. In some embodiments, relative-humidity-estimation module 108 operates on computer system 110. In other embodiments, relative-humidity-estimation module 108 operates on one or more service processors. In still other embodiments, relative-humidity-estimation module 108 is located inside of computer system 110. In yet other embodiments, relative-humidity-estimation module 108 operates on a separate computer system.

In some embodiments, relative-humidity-estimation module 108 includes a relative-humidity model that uses a model of the relative humidity inside computer system 110 which is generated during a training phase. The relative-humidity model produces an estimate of relative-humidity inside computer system 110 at a predetermined location based on information contained in performance parameters monitored by performance-parameter monitor 102, the external relative humidity monitored by external-relative-humidity monitor 104, and the location of a relative humidity monitor sensor inside computer system 110 during the training phase. In some embodiments, the relative-humidity model estimates the relative humidity inside the computer system at each of a plurality of locations inside the computer system where the relative humidity was measured during the training phase. The training phase is discussed in more detail below with respect to FIGS. 3 and 4.

In some embodiments, the external relative humidity is a predetermined value and external-relative-humidity monitor 104 is omitted. In some embodiments, the predetermined external relative humidity is input into relative-humidity-estimation module 108. In other embodiments, the predetermined external relative humidity is included in the relative-humidity model.

Figure 2:
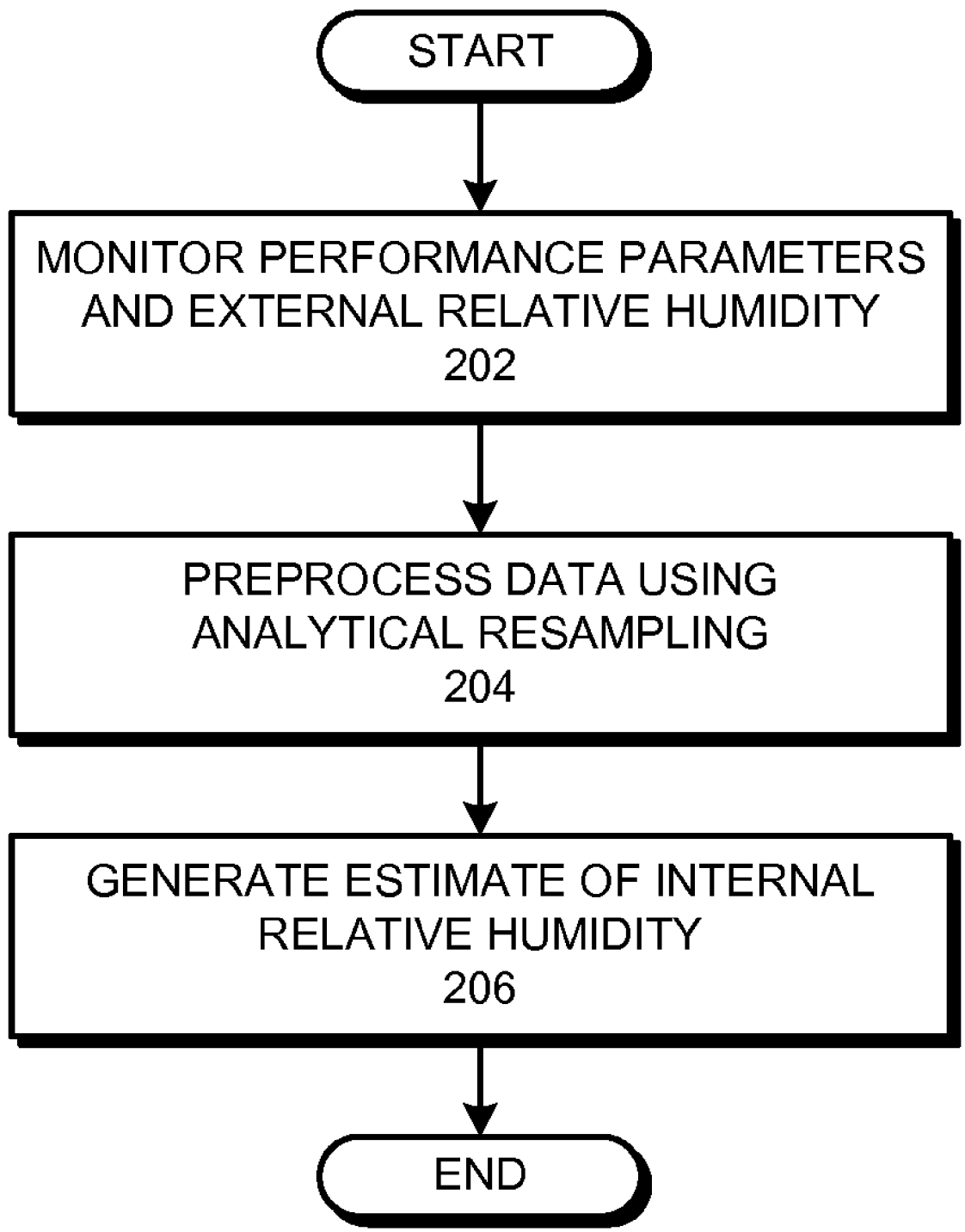
FIG. 2 presents a flow chart illustrating a process that estimates a relative humidity inside a computer system in accordance with some embodiments of the present invention.

FIG. 2 presents a flow chart illustrating a process that estimates a relative humidity inside a computer system in accordance with some embodiments of the present invention. First, performance parameters of the computer system and the relative humidity of the air outside of the computer system are monitored (step 202). The performance parameter and relative humidity data are then preprocessed using analytical resampling (step 204). In some embodiments, the data are preprocessed using techniques referred to and described in the U.S. patent application entitled "Synchronizing Signals Related to the Operation of a Computer System," by Kalyanaraman Vaidyanathan and Kenny C. Gross, application Ser. No. 12/101,321, filed Apr. 11, 2008. In some embodiments, step 204 is omitted.

Next, an estimate of the relative humidity inside the computer system is generated (step 206). The estimate is generated using a relative-humidity model trained during a training phase as described in FIGS. 3 and 4 below. In some embodiments, the estimate of relative humidity inside the computer system includes an estimate of the relative humidity at a predetermined location inside the computer system based on information contained in the monitored performance parameters and external relative humidity, and the location of a relative humidity sensor inside the computer system during the training phase. In some embodiments, the relative-humidity model uses a statistical pattern-recognition technique. In some embodiments, a nonlinear, nonparametric (NLNP) regression technique, such as a multivariate state estimation technique, is used. In other embodiments, other pattern-recognition techniques, such as neural networks or other types of NLNP regression, are used. Yet other embodiments of the present invention use linear regression techniques.

In some embodiments, as discussed in more detail with reference to FIGS. 3 and 4 below, the estimate of relative humidity is generated by the relative-humidity model using pattern recognition, wherein the model is trained based on the behavior of the monitored performance parameters and external relative humidity as related to the measured relative humidity at a predetermined location inside the computer system. In some embodiments, during the training phase, the relative humidity is measured at a plurality of locations inside the computer system as a load on a processor in the computer system is varied. During operation, the model estimates the relative humidity inside the computer system at each of the plurality of locations inside the computer system where the relative humidity was measured during the training phase.

In some embodiments, the external relative humidity is a predetermined value and is not monitored in step 202. In some embodiments, the predetermined external relative humidity is used in step 206 to generate the estimate of the internal relative humidity. In other embodiments, the predetermined external relative humidity is included in the relative-humidity model.

Figure 3:
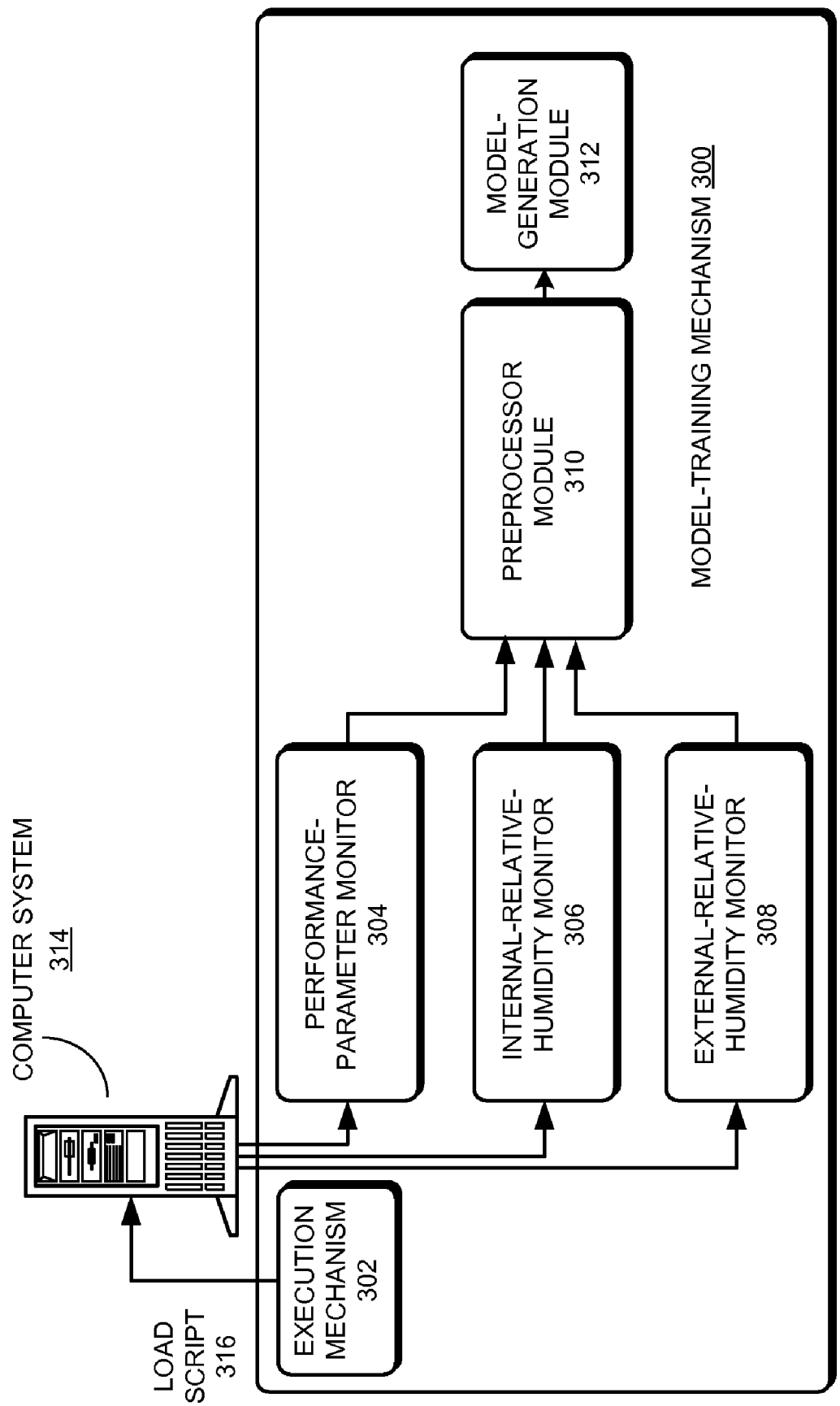
FIG. 3 represents a system that trains a model for estimating a relative humidity inside a computer system in accordance with some embodiments of the present invention.

FIG. 3 represents a system that trains a model for estimating a relative humidity inside a computer system in accordance with some embodiments of the present invention. Model-training mechanism 300 includes execution mechanism 302, performance-parameter monitor 304, internal-relative-humidity monitor 306, external-relative-humidity monitor 308, preprocessor module 310 and model-generation module 312.

Computer system 314 can include but is not limited to a server, a server blade, a data center server, a field-replaceable unit, an enterprise computer, or any other computation system that includes one or more processors and one or more cores in each processor. In some embodiments, computer system 314 is similar to computer system 110. In some embodiments, computer system 314 is the same or similar model as computer system 110. In some embodiments, computer system 314 is the same computer system as computer system 110.

Performance-parameter monitor 304 can be any device that can monitor performance parameters of computer system 314, including but not limited to: temperatures, currents, voltages and fan speeds, performance metrics, loads, throughput variables, transaction latencies, and time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006. Performance-parameter monitor 304 can be implemented in any combination of hardware and software. In some embodiments, performance-parameter monitor 304 operates on computer system 314. In other embodiments, performance-parameter monitor 304 operates on one or more service processors. In still other embodiments, performance-parameter monitor 304 is located inside of computer system 314. In yet other embodiments, performance-parameter monitor 304 operates on a separate computer system. In some embodiments, performance-parameter monitor 304 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006.

Internal-relative-humidity monitor 306 can be any device that can monitor the relative humidity of the air inside of computer system 314. In some embodiments, internal-relative-humidity monitor 306 includes a sensor coupled to internal-relative-humidity monitor 306 located at a predetermined location inside computer system 314. The sensor senses the relative humidity at the predetermined location and sends a signal to internal-relative-humidity monitor 306 representing the sensed relative humidity. Internal-relative-humidity monitor 306 can be implemented in any combination of hardware and software. In some embodiments, internal-relative-humidity monitor 306 operates on computer system 314. In other embodiments, internal-relative-humidity monitor 306 operates on one or more service processors. In still other embodiments, internal-relative-humidity monitor 306 is located inside of computer system 314. In yet other embodiments, internal-relative-humidity monitor 306 operates on a separate computer system.

External-relative-humidity monitor 308 can be any device that can monitor the relative humidity of the air outside of computer system 314. External-relative-humidity monitor 308 can be implemented in any combination of hardware and software. In some embodiments, external-relative-humidity monitor 308 operates on computer system 314. In other embodiments, external-relative-humidity monitor 308 operates on one or more service processors. In still other embodiments, external-relative-humidity monitor 308 is located inside of computer system 314. In yet other embodiments, external-relative-humidity monitor 308 operates on a separate computer system.

Preprocessor module 310 can be any device that can preprocess input received from performance-parameter monitor 304, internal-relative-humidity monitor 306, and external-relative-humidity monitor 308 into a form for input into model-generation module 312. In some embodiments, preprocessor module 310 is omitted, or operates on performance-parameter monitor 304, internal-relative-humidity monitor 306, external-relative-humidity monitor 308, or model-generation module 312. Preprocessor module 310 can be implemented in any combination of hardware and software. In some embodiments, preprocessor module 310 operates on computer system 314. In other embodiments, preprocessor module 310 operates on one or more service processors. In still other embodiments, preprocessor module 310 is located inside of computer system 314. In yet other embodiments, preprocessor module 310 operates on a separate computer system. In some embodiments, preprocessor module 310 implements techniques referred to and described in the U.S. patent application entitled "Synchronizing Signals Related to the Operation of a Computer System," by Kalyanaraman Vaidyanathan and Kenny C. Gross, application Ser. No. 12/101,321, filed Apr. 11, 2008.

In some embodiments, execution mechanism 302 causes load script 316 to be executed by computer system 314 during a model-training process. Note that the model-training process can be performed in parallel with normal computer system operation. In some embodiments, load script 316 is stored on computer system 314. In some embodiments of the present invention, load script 316 can include a sequence of instructions that produces a load profile that ranges from no load to a maximum load for a processor in computer system 314. In some embodiments, the load profile of load script 316 is selected based on an operating envelope for computer system 314 wherein the operating envelope is determined based on operating parameters that can include, but are not limited to, the specific applications and number of cycles of the applications that are or will be run on computer system 314, and environmental conditions in which computer system 314 is or will be operated. Environmental conditions can include but are not limited to temperature, relative humidity, temperature cycling, relative humidity cycling and any other factor that could affect the relative humidity inside computer system 314. Load script 316 then cycles through one or more operating profiles within the operating envelope wherein each operating profile is based on a configuration of operating parameters for computer system 314 within the operating envelope.

In some embodiments, as load script 316 is executed on computer system 314, performance-parameter monitor 304 monitors performance parameters of computer system 314, internal-relative-humidity monitor 306 monitors the relative humidity inside computer system 314, and external-relative-humidity monitor 308 monitors the relative humidity outside of computer system 314. Preprocessor module 310 processes the data from performance-parameter monitor 304, internal-relative-humidity monitor 306, and external-relative-humidity monitor 308 to put it in a form for use by model-generation module 310. In some embodiments, preprocessor module 310 resamples the received data so that the data sent to model-generation module 312 has a uniform sampling rate. In some embodiments, preprocessor module 310 synchronizes the received data so that the data sent to model-generation module 312 is in-phase. In some embodiments, preprocessor module 310 preprocesses the received data using techniques referred to and described in the U.S. patent application entitled "Synchronizing Signals Related to the Operation of a Computer System," by Kalyanaraman Vaidyanathan and Kenny C. Gross, application Ser. No. 12/101,321, filed Apr. 11, 2008. In some embodiments, preprocessor module 310 is omitted or is included in performance-parameter monitor 304, internal-relative-humidity monitor 306, and external-relative-humidity monitor 308, and/or model-generation module 312.

Model-generation mechanism 312 receives the data from preprocessor module 310 and generates a relative humidity model. In some embodiments, model-generation mechanism 312 uses data from performance-parameter monitor 304, internal-relative-humidity monitor 306, and external-relative-humidity monitor 308 to generate a relative-humidity model using a statistical pattern-recognition technique. In some embodiments, an NLNP regression technique, such as a multivariate state estimation technique, is used. In other embodiments, other pattern-recognition techniques, such as neural networks or other types of NLNP regression, are used. Yet other embodiments of the present invention use linear regression techniques.

In some embodiments, internal-relative-humidity monitor 308 monitors the relative humidity inside the computer system at a plurality of locations inside the computer system. In some embodiments the locations inside the computer system can include, but are not limited to one or more of the following: inside or near a component, connector, socket, subassembly, or package; or the entire volume inside the computer system or any portion thereof. During operation, the relative-humidity model estimates the relative humidity inside the computer system at each of the plurality of locations inside the computer system where the relative humidity was measured during the training phase.

In some embodiments, the external relative humidity is a predetermined value and external-relative-humidity monitor 308 is omitted. In some embodiments, the predetermined external relative humidity is input into model-generation module 312. In some embodiments, the predetermined external relative humidity is included in the relative-humidity model.

Figure 4:
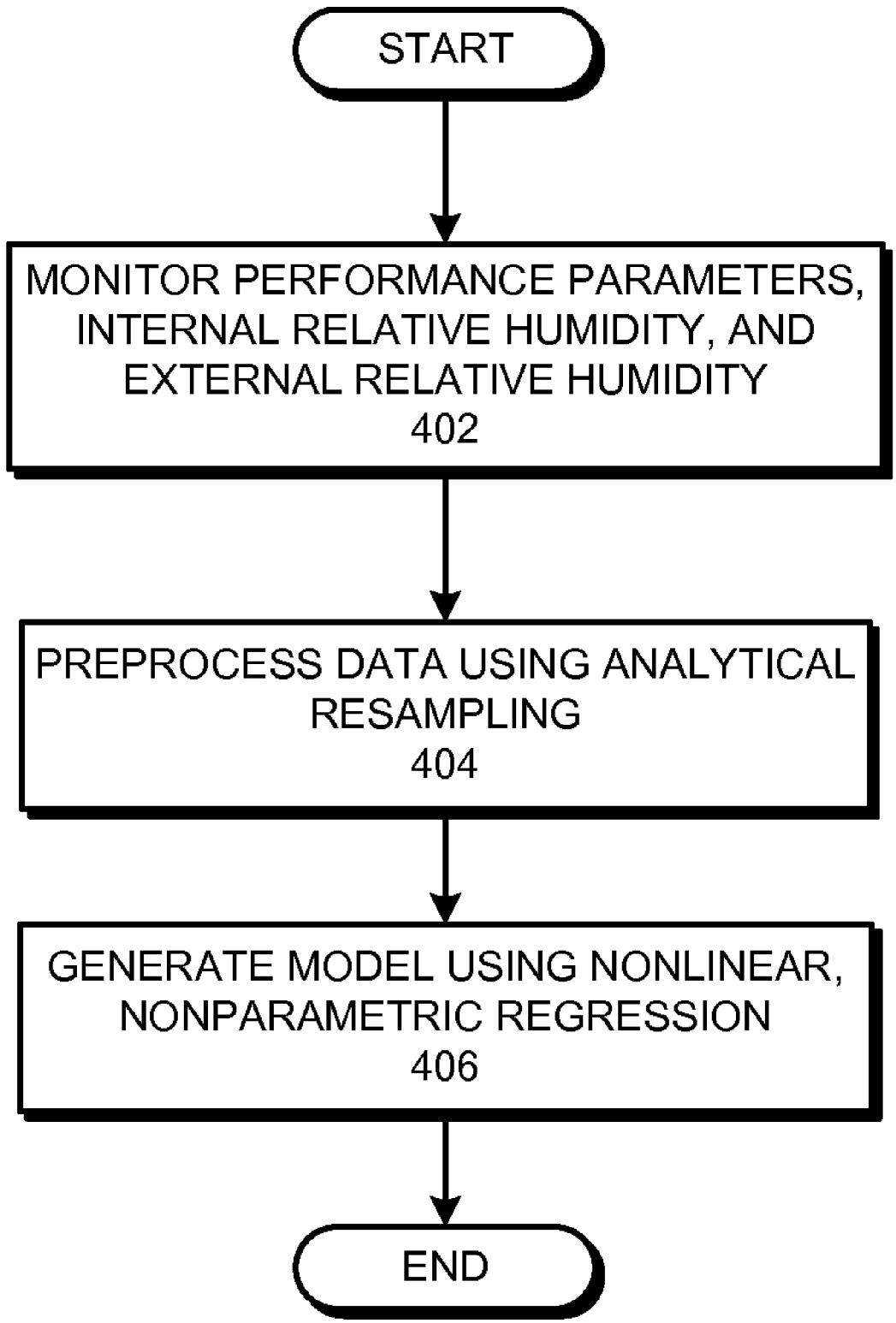
FIG. 4 presents a flow chart illustrating a process that trains a model for estimating a relative humidity inside a computer system in accordance with some embodiments of the present invention.

FIG. 4 presents a flow chart illustrating a process that trains a model for estimating a relative humidity inside a computer system in accordance with some embodiments of the present invention. First, performance parameters, internal relative humidity, and external relative humidity for a computer system are monitored when the load on a processor in the computer system is varied from a minimum load to a maximum load (step 402). The data is then preprocessed using analytical resampling (step 404). In some embodiments, techniques referred to and described in the U.S. patent application entitled "Synchronizing Signals Related to the Operation of a Computer System," by Kalyanaraman Vaidyanathan and Kenny C. Gross, application Ser. No. 12/101,321, filed Apr. 11, 2008. In other embodiments, this step is omitted. Then, a relative humidity model is generated using NLNP regression (step 406). In some embodiments, a multivariate state estimation technique is used. In other embodiments, statistical pattern-recognition techniques or other pattern-recognition techniques, such as neural networks or other types of NLNP regression, are used. Yet other embodiments of the present invention use linear regression techniques.

In some embodiments, in step 402, performance parameters, internal relative humidity, and external relative humidity for the computer system are monitored when the load on the processor is running a load script. The load profile of the load script is selected based on an operating envelope for the computer system wherein the operating envelope is determined based on operating parameters that can include, but are not limited to, the specific applications and number of cycles of the applications that are or will be run on the computer system, and environmental conditions in which the computer system is or will be operated. Environmental conditions can include but are not limited to temperature, relative humidity, temperature cycling, relative humidity cycling and any other factor that could affect the relative humidity inside the computer system. The load script then cycles through one or more operating profiles within the operating envelope wherein each operating profile is based on a configuration of operating parameters for the computer system within the operating envelope.

In some embodiments, the external relative humidity is a predetermined value and is not monitored in step 402. In some embodiments, the predetermined external relative humidity is used in step 406 to generate the model. In other embodiments, the predetermined external relative humidity is included in the relative-humidity model.

It is noted that in some embodiments, relative-humidity-estimation mechanism 100 and model-training mechanism 300 operate on the same hardware and/or software, or include the same hardware and/or software. In some embodiments, performance-parameter monitor 102 and performance-parameter monitor 304 are the same mechanism, operate on the same hardware and/or software, or include the same hardware and/or software. In some embodiments, preprocessor module 106 and preprocessor module 310 are the same mechanism, operate on the same hardware and/or software, or include the same hardware and/or software. In some embodiments, external-relative-humidity monitor 106 and external-relative-humidity monitor 308 are the same mechanism, operate on the same hardware and/or software, or include the same hardware and/or software.

Also note that the present invention is not meant to be limited to any particular type or implementation of a computer system. In general, the present invention can be applied to any type of computer system including but not limited to, a computer system based on a microprocessor, a mainframe computer, a computer server, a digital signal processor, a portable computing device, a personal organizer, a device controller, and a computational engine within an appliance.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for using a computer to estimate a relative humidity inside a computer system, comprising:
monitoring a set of performance parameters of the computer system; and
estimating the relative humidity inside the computer system based on the set of performance parameters, and a relative humidity model;
wherein training of the relative humidity model includes monitoring a training relative humidity while monitoring the set of performance parameters of the computer system; and
wherein estimating the relative humidity inside the computer system includes using a pattern-recognition technique.

2. The method of claim 1, further including:
monitoring a monitored relative humidity, wherein estimating the relative humidity inside the computer system includes estimating the relative humidity inside the computer system based on the monitored relative humidity.

3. The method of claim 1, wherein the training relative humidity includes a relative humidity inside the computer system.

4. The method of claim 3, wherein the training relative humidity includes a relative humidity outside the computer system.

5. The method of claim 1,
wherein monitoring the set of performance parameters of the computer system includes systematically monitoring and recording a set of performance parameters of the computer system; and
wherein the recording process keeps track of the temporal relationships between events in different performance parameters.

6. The method of claim 1, wherein estimating the relative humidity inside the computer system includes using a multivariate state estimation technique.

7. The method of claim 1, wherein training the relative humidity model includes using a pattern-recognition technique.

8. The method of claim 1, wherein training the relative humidity model includes using a multivariate state estimation technique.

9. A non-transitory computer-readable storage medium storing instructions that when executed by a computer cause the computer to perform a method for estimating a relative humidity inside a computer system, the method comprising:
monitoring a set of performance parameters of the computer system; and
estimating the relative humidity inside the computer system based on the set of performance parameters, and a relative humidity model;
wherein training of the relative humidity model includes monitoring a training relative humidity while monitoring the set of performance parameters of the computer system; and
wherein estimating the relative humidity inside the computer system includes using a pattern-recognition technique.

10. The computer-readable storage medium of claim 9, the method further including:
monitoring a monitored relative humidity, wherein estimating the relative humidity inside the computer system includes estimating the relative humidity inside the computer system based on the monitored relative humidity.

11. The computer-readable storage medium of claim 9, wherein the training relative humidity includes a relative humidity outside the computer system.

12. The computer-readable storage medium of claim 9,
wherein monitoring the set of performance parameters of the computer system includes systematically monitoring and recording a set of performance parameters of the computer system; and
wherein the recording process keeps track of the temporal relationships between events in different performance parameters.

13. The computer-readable storage medium of claim 9, wherein estimating the relative humidity inside the computer system includes using a multivariate state estimation technique.

14. The computer-readable storage medium of claim 9, wherein training the relative humidity model includes using a pattern-recognition technique.

15. The computer-readable storage medium of claim 9, wherein training the relative humidity model includes using a multivariate state estimation technique.

16. An apparatus for estimating a relative humidity inside a computer system, comprising:
a monitoring mechanism configured to monitor a set of performance parameters of the computer system and an external relative humidity outside of the computer system;
an estimating mechanism configured to estimate the relative humidity inside the computer system based on the set of performance parameters, the external relative humidity, and a relative humidity model; and
wherein training of the relative humidity model includes measuring an external training relative humidity outside of the computer system and a training relative humidity inside the computer system while monitoring the set of performance parameters of the computer system;
wherein estimating the relative humidity inside the computer system includes using a pattern-recognition technique.

17. The apparatus of claim 16,
wherein the monitoring mechanism includes a mechanism configured to systematically monitor and record a set of performance parameters of the computer system; and
wherein the recording process keeps track of the temporal relationships between events in different performance parameters.

18. The apparatus of claim 16, wherein training the relative humidity model includes using a multivariate state estimation technique.

* * * * *